United States Patent [19]
Hilmersson et al.

[11] Patent Number: 4,776,367
[45] Date of Patent: Oct. 11, 1988

[54] ASEPTIC CONSTANT-FLOW VALVE

[75] Inventors: Anders E. Hilmersson, Helsingborg, Sweden; Maurizio Cazzarolli, Curtatona, Italy

[73] Assignee: Tetra Dev-Go, Modena, Italy

[21] Appl. No.: 918,094

[22] Filed: Oct. 14, 1986

[30] Foreign Application Priority Data

Oct. 14, 1985 [IT] Italy .................. 22471 A/85

[51] Int. Cl.⁴ .................. G05D 7/01; F16K 31/36
[52] U.S. Cl. .................................................. 137/501
[58] Field of Search ............... 137/501, 500, 502, 503, 137/536

[56] References Cited

U.S. PATENT DOCUMENTS

| | | | |
|---|---|---|---|
| 1,715,801 | 6/1929 | Turner | 137/501 |
| 2,339,753 | 1/1944 | Bloom | 137/501 |
| 2,579,334 | 12/1951 | Plank | 137/501 X |
| 2,868,225 | 1/1959 | Wigham et al. | 137/503 |
| 3,177,892 | 4/1965 | Grandstaff | 137/501 |
| 4,508,140 | 4/1985 | Harrison | 137/501 |

FOREIGN PATENT DOCUMENTS

| | | |
|---|---|---|
| 2356413 | 5/1974 | Fed. Rep. of Germany . |
| 203216 | 10/1983 | Fed. Rep. of Germany . |
| 721241 | 1/1955 | United Kingdom . |
| 1403880 | 8/1975 | United Kingdom . |
| 1401994 | 8/1975 | United Kingdom . |

Primary Examiner—Martin P. Schwardron
Assistant Examiner—Stephen M. Hepperle
Attorney, Agent, or Firm—Burns, Doane, Swecker & Mathis

[57] ABSTRACT

Aseptic constant flow valves to be used, for example, in the dairy industry should be readily washable and allow sterilization by means of conventional washing and sterilizing agents. A valve which fulfils these requirements comprises an operating chamber with inlet and outlet which is connected to the valve housing and therefore can be circulation-washed and sterilized together with the latter.

14 Claims, 1 Drawing Sheet

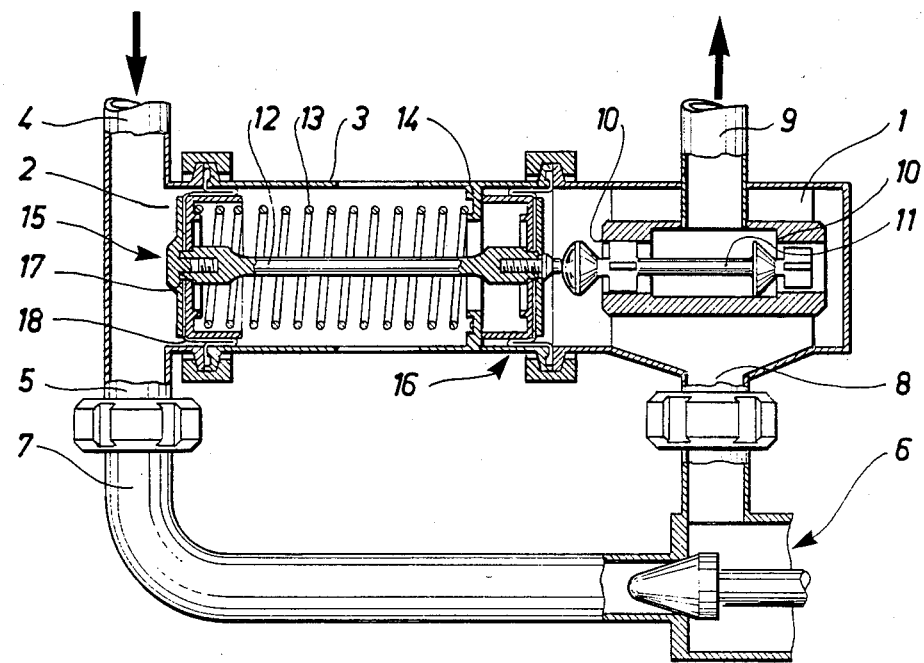

4,776,367

ASEPTIC CONSTANT-FLOW VALVE

The present invention relates to an aseptic constant-flow valve comprising a valve housing provided with inlet and outlet, a movable valve body located in the valve housing, and an operating mechanism for the same.

BACKGROUND OF THE INVENTION

In the packaging of liquid goods, e.g. milk, cream, juice or the like in packing containers of the non-returnable type, automatic packing machines are used which by means of a pipeline are connected to units for the treatment and transport of the contents to the machine. To ensure that the contents flow to the packing machine at an even and predetermined volume per unit of time, a so-called constant-flow valve is usually present upstream of each packing machine which sees to it that irrespectively of pressure variations in the feed line the flow is kept constant. The hygienic demands on such a valve are very high, especially when the packing machine is of the aseptic type, that is to say when it manufactures packages which are to be filled with contents previously subjected to sterile treatment.

In other words the use of constant flow valves in product lines implies that the valve must be of such a design that it can be cleaned and washed in a simple manner. When the valve is intended for sterile contents it is also important that it should be of a shape allowing it to be sterilized after the washing. Such a sterilization may be done, e.g., with the help of steam or some chemical sterilizing agent, e.g. hydrogen peroxide.

Constant flow valves known previously are of a design which makes them little suitable for use in conjunction with aseptic packing machines. The valves comprise a valve housing with a movable valve body whose position is controlled by an operating mechanism as a function of the actual pressure in the line to which the valve is connected. The operating mechanism and its components are usually of an unprotected design and will therefore come into contact with the contents thus making it difficult to clean the valve and causing it to be wholly unsuitable for use with sterile contents.

OBJECTS AND SUMMARY

It is an object of the present invention to provide a constant flow valve which is well suited for use with sterile contents and which is not subject to the disadvantages which characterize constant flow valves used hitherto.

It is a further object of the present invention to provide an aseptic constant flow valve which is of a simple and reliable design and which can be expected, therefore, to give operational safety even during prolonged usage.

It is a further object of the present invention to provide a constant flow valve which is well suited for circulation sterilization with the help of sterilizing agents, e.g. steam or hydrogen peroxide customarily used.

These and other objects have been achieved in accordance with the invention in that an aseptic constant flow valve comprising a valve housing provided with inlet and outlet, a movable valve body located in the valve housing and an operating mechanism for the latter has been given the characteristic that it comprises an operating chamber which has an inlet and an outlet and which is connected to the valve housing.

Preferred embodiments of the valve in accordance with the invention have been given moreover the characteristics which are evident from the attached subsidiary claims.

By providing the constant flow valve in accordance with the invention with an operating chamber through which flow the passing contents, and with an operating mechanism whose components forming an integral part are separated from the contents, a constant flow valve is obtained which is well suited for aseptic usage and which can be circulation-washed and sterilized by a washing and sterilizing agent customarily used in the foodstuff industry. The placing of the operating chamber upstream of the valve housing, as seen in the direction of flow of the contents, also ensures a good valve function with rapid and exact correction of the flow in the event of pressure variations.

A preferred embodiment of the aseptic constant flow valve in accordance with the invention will now be described in more detail with special reference to the enclosed schematic drawing which only shows the details necessary for an understanding of the invention.

In the FIGURE is shown, partly in section, an aseptic constant flow valve in accordance with the present invention, which can be installed in a feed line for liquid contents, e.g., milk to a packing machine. It is a purpose of the constant flow valve to ensure that the contents are fed to the packing machine at a constant flow which can be precisely adjusted to a specified value which cannot be affected subsequently by pressure variations and pressure surges in the product line.

The constant flow valve illustrated consists of two main parts, namely a valve housing 1 on the right in the FIGURE and an operating chamber 2 on the left in the Figure. The valve housing 1 and the operating chamber 2 are physically connected with each other by means of a spacer member 3. The operating chamber 2 has an inlet 4 which is connected to a feed line for contents, not shown, and an outlet 5 which, via a connection pipe 7 provided with a control valve 6, is joined to an inlet 8 to the valve housing 1. From the valve housing 1, an outlet 9 is connected to a feed pipe (not shown) to a packing machine of a known type.

The outlet 9 is T-shaped and has on its part located in the valve housing 1 two valve seats 10 which together with a two-part valve body 11 form a balanced seat valve of conventional type.

Inside the tubular spacer member 3 is a spindle 12, arranged coaxially, which extends in the prolongation of the valve body and is connected to the same. The spindle 12 is surrounded by a helical compression spring 13, one end of which rests against a plate 14 provided with holes situated in the spacer element 3. The opposite end of the spring 13 rests against a first pressure-sensitive element 15, which forms a wall in the operating chamber 2.

DETAILED DESCRIPTION

On the side of the plate 14 facing towards the valve housing 1 there is a second pressure-sensitive element 16 which is identical with the first pressure-sensitive element 15 but mounted in a mirror-inverted way. Each of the two pressure-sensitive elements 15,16 comprises a piston 17 which by means of an annular roller membrane 18 is joined in a liquid-tight manner to the two ends of the spacer member 3 respectively. Between the two pressure-sensitive elements 15,16 there is thus a chamber separated from the contents wherein are situated the spindle 12, the spring 13 and the plate 14. To reveal a possible liquid leakage through the pressure-sensitive elements 15,16 the spacer member 3 is provided with telltale openings in a conventional manner.

As is evident from the FIGURE, the constant flow valve is composed of several parts which are manufactured from stainless steel and are screwed together with the help of so-called dairy joints. Beside making possible a simple assembly and dismantling this also ensures a simple substitution of parts when this is justified. The materials chosen permit washing even with strong cleaning agents, e.g., caustic soda, and sterilization with the help of steam or hydrogen peroxide. Finally the design has been carried out such that washing and a sterilizing agent can flow unobstructed through the constant flow valve without the circulation being hindered by blind passages or corners.

During operation of the constant flow valve, in accordance with the invention, the contents sterilized previously, e.g., so-called UHT-milk, flow via the feed line (not shown) to the inlet 4 of the operating chamber 2. The contents thereby come into contact with the first pressure-sensitive element 15 and thereafter flow via the outlet 5 of the operating chamber 2 and connection tube 7 to the control valve 6. This is set manually or automatically to the desired value so that a predetermined flow per unit of time to the packing machine is obtained. As a result a pressure drop is produced in the contents when they flow in to the valve housing 1 via the inlet 8. In the valve housing 1 the contents come into contact with the second pressure-sensitive device 16 and thereafter flow past the valve body 11 and via the T-shaped outlet pipe 9 out of the valve housing and to the subsequent packing machine, not shown in the drawing.

Depending on the setting of the control valve 6 a greater or lesser pressure difference will arise between the contents which are in the operating chamber 2 and the contents which are in the valve housing 1. The two pressure-sensitive elements 15,16 will be acted upon in the process such that together with the spindle and the valve body 11 they tend to be moved in a direction towards the lower pressure, that is to say to the right in the Figure. However, with the help of the chosen spring characteristics of the compression spring 13 this tendency is counteracted so that the valve body 11 is held at such a distance from the two valve seats 10 that the flow via the T-shaped outlet pipe 9 corresponds to the flow through the control valve 6, as a result of which a stable steady state comes into being. Now should any pressure variation, e.g., a pressure increase, occur in the feed pipe for contents the pressure in the operating chamber 2 will increase. Owing to the unaltered position of the control valve 6 the two pressure-sensitive elements 15,16 will be immediately subjected to a greater pressure difference than previously, which means that they will move the spindle against the effect of the spring 13 in the direction to the right so that the valve body 11 approaches the valve seats 10 and reduces the free area through the outlet 9, thus causing the flow to the packing machine to remain unaltered in spite of the increased pressure in the feed line. In the event of sudden pressure reductions in the feed line the constant flow valve regulates in corresponding manner in the opposite direction so that the free area through the outlet 9 increases in order to compensate for the diminished line pressure and to see to it that the flow to the packing machine remains constant all the time.

The regulating characteristics of the constant flow valve depend upon many factors, e.g., the valve and pipe sizes, the area of the pressure-sensitive elements 15,16 and the design of the spring 13. Calculations, therefore, will have to be carried out in each individual case in order to adapt the valve according to the calculated product flow and pressure. In the application of the constant flow valve according to the invention mentioned earlier, that is to say between the feed line for the contents and a packing machine of known type, the valve should be designed for a capacity of between 1 and 10 cubic meters per hour and a typical pressure of approx. 1 bar, which however may vary between 0.5 and 5 bar. It will be technically possible, however, to design the valve so that appreciably higher flows and pressures can be dealt with.

Since the valve housing 1 as well as the operating chamber 2 and the intermediary member are placed in series along the flow path, the constant flow valve allows an effective circulation washing whereby each part of the valve which normally comes into contact with the contents can be effectively cleaned. The parts coming into contact with the contents are of a relatively uncomplicated shape and do not have corners or pockets which may render cleaning difficult. The spindle 12, the spring 13 and the plate 14, as well as the parts carrying the pressure-sensitive elements 15,16 are separated from the contents by means of the two rolling membranes 18. The location of the parts in the operating chamber 2, which via the telltale openings is in contact with the surrounding atmosphere, also means that any leakage in the pressure-sensitive elements is immediately revealed. The design provides good regulating accuracy and is well capable of compensating pressure variations. This has to be ascribed partly to the fact that the operating chamber is located upstream of the valve housing 1 as seen in the direction of flow, as a result of which the valve reacts rapidly and with great accuracy even in the case of relatively viscous contents.

Although only a preferred embodiment is specifically illustrated and described herein, it will be appreciated that many modifications and variations of the present invention are possible in light of the above teachings and within the purview of the appended claims without departing from the spirit and intended scope of the invention.

We claim:

1. An aseptic constant-flow valve for controlling the flow of a fluid, comprising:
    a fluid path extending through the valve;
    a valve housing having an inlet and an outlet, said valve housing forming a portion of said fluid path;
    a valve body located in the valve housing for closing the valve;
    an operating chamber connected to the valve housing and forming another portion of said fluid path such that fluid passing through the valve must also pass through the operation chamber;
    said operating chamber being upstream of the valve housing;
    first means located in the operating chamber for sensing the pressure of the fluid in the operating chamber;
    second means located in the valve housing for sensing the pressure of the fluid in the valve housing;

means for interconnecting the first and second pressure sensing means, said interconnecting means being operatively connected to said valve body; and spring means for applying a biasing force on the interconnecting means to maintain the valve body in an open position when the fluid pressure differential between the operating chamber and the valve housing is less than a predetermined amount;

said spring means being located outside of the fluid path such that said spring means is not in contact with any fluid passing through the valve.

2. The valve of claim 1, wherein the first movable means forms a wall in the operating chamber.

3. The valve of claim 1, wherein the second movable means forms a wall in the valve housing.

4. The valve of claim 1, further comprising a control valve located between the operating chamber and the valve housing.

5. The valve of claim 1, further comprising a spacer member interconnected between the operating chamber and the valve housing, said spacer member being outside of the fluid path.

6. The valve of claim 5, wherein the spring means and the interconnecting means are located within the spacer member.

7. The valve of claim 6, wherein the first and second pressure sensing means are located at opposite ends of the spacer member.

8. The valve of claim 7, wherein the first and second pressure sensing means comprise pistons that are connected to the spacer member by means of flexible membranes.

9. The valve of claim 8, wherein the membranes prevent the fluid from entering the spacer membrane.

10. The valve of claim 1, wherein the spring means maintains the valve body in an open position when the fluid pressure in the operating chamber is less than the predetermined amount above the fluid pressure in the valve housing.

11. The vale of claim 10, wherein the valve body is in a closed position when the pressure in the operating chamber is greater than the predetermined amount above the pressure in the valve housing.

12. The valve of claim 1, wherein said interconnecting means is located outside of the fluid path such that said interconnecting means is not in contact with any fluid passing through the valve.

13. The valve of claim 1, wherein said operating chamber has a fluid inlet at one end thereof, and said first pressure sensing means is located between the fluid inlet and the fluid outlet of the operating chamber.

14. The valve of claim 1, wherein said operating chamber is substantially tubular in shape.

* * * * *